(12) United States Patent
Andrews et al.

(10) Patent No.: US 11,421,118 B2
(45) Date of Patent: Aug. 23, 2022

(54) NANOREDISPERSIBLE MICROPARTICLES OF DRIED CELLULOSE NANOCRYSTALS AND METHOD OF PRODUCTION THEREOF

(71) Applicant: ANOMERA INC., Montreal (CA)

(72) Inventors: Mark P. Andrews, Westmount (CA); Timothy Morse, Toronto (CA); Amir Khabibullin, Toronto (CA); Muntaser Farooque, Etobicoke (CA); Monika Rak, Montreal (CA)

(73) Assignee: ANOMERA INC., Montreal (CA)

( * ) Notice: Subject to any disclaimer, the term of this patent is extended or adjusted under 35 U.S.C. 154(b) by 0 days.

(21) Appl. No.: 17/430,601

(22) PCT Filed: Feb. 11, 2020

(86) PCT No.: PCT/CA2020/050179
§ 371 (c)(1),
(2) Date: Aug. 12, 2021

(87) PCT Pub. No.: WO2020/163948
PCT Pub. Date: Aug. 20, 2020

(65) Prior Publication Data
US 2022/0186049 A1 Jun. 16, 2022

Related U.S. Application Data

(60) Provisional application No. 62/806,425, filed on Feb. 15, 2019, provisional application No. 62/846,269, filed on May 10, 2019.

(51) Int. Cl.
*C08B 15/02* (2006.01)
*C09D 7/65* (2018.01)
(Continued)

(52) U.S. Cl.
CPC ............... *C09D 7/65* (2018.01); *C08B 15/02* (2013.01); *C09D 125/14* (2013.01); *C09D 133/04* (2013.01)

(58) Field of Classification Search
CPC ........ C08B 15/02; C09D 7/65; C09D 125/14; C09D 133/04
(Continued)

(56) References Cited

U.S. PATENT DOCUMENTS 4,481,076 A 11/1984 Herrick

FOREIGN PATENT DOCUMENTS

WO 2014183082 A1 11/2014
WO 2016015148 A1 2/2016

OTHER PUBLICATIONS

Takaichi et al., "Improvement of nanodispersibility of oven dried TEMPO oxidized celluloses in water" in Cellulose, Sep. 16, 2014. vol. 21, pp. 4093-4103 (Year: 2014).*

(Continued)

*Primary Examiner* — Kelechi C Egwim
(74) *Attorney, Agent, or Firm* — Banner & Witcoff, Ltd.

(57) ABSTRACT

A microparticle comprised of dried cellulose nanocrystals agglomerated together and forming said microparticle is provided, wherein the CNCs are surfaced-reduced carboxylated CNCs, and wherein the microparticle is nanoredispersible into its constituting cellulose nanocrystals in both aqueous and non-aqueous solvents. A method for producing nanoredispersible microparticles comprised of dried CNCs is also provided.

20 Claims, 7 Drawing Sheets

(51) Int. Cl.
  *C09D 125/14* (2006.01)
  *C09D 133/04* (2006.01)
(58) Field of Classification Search
  USPC .......................................................... 536/56
  See application file for complete search history.

(56) References Cited

OTHER PUBLICATIONS

Takaichi et al. "Improvement of nanodispersibility of oven-dried TEMPO-oxidized celluloses in water," Cellulose, 2014, vol. 21, pp. 4093-4103.
International Search Report and Written Opinion for Appln No. PCT/CA2020/050179, dated Apr. 23, 2020.

* cited by examiner

NANOREDISPERSIBLE MICROPARTICLES OF DRIED CELLULOSE NANOCRYSTALS AND METHOD OF PRODUCTION THEREOF

CROSS REFERENCE TO RELATED APPLICATIONS

This application is a U.S. national phase application of PCT/CA2020/050179 filed on Feb. 11, 2020, which claims benefit, under 35 U.S.C. § 119(3), of U.S. provisional application Ser. No. 62/806,425 filed on Feb. 15, 2019 and of U.S. provisional application Ser. No. 62/846,269, filed on May 10, 2019. All documents above are incorporated herein in their entireties by reference.

FIELD OF THE INVENTION

The present invention relates to microparticles of cellulose nanocrystals and to a method for producing said microparticles. More specifically, the present invention is concerned with nanoredispersible microparticles of dried cellulose nanocrystals that are surfaced-reduced and, as such, bear on their surface hydroxyl groups at the C2, C3, and/or C6 position of the cellulose.

BACKGROUND OF THE INVENTION

Cellulose nanocrystals (CNCs), also called nanocrystalline cellulose or crystalline nanocellulose, are known in the art.

Cellulose is a hydrophilic semi-crystalline polysaccharide. Cellulose is naturally organized into long linear chains of ether-linked poly(β-1,4-glucopyranose) units. These chains assemble by intra- and inter-molecular hydrogen bonds into highly crystalline domains—see FIG. 1. Regions of disordered (amorphous) cellulose exist between these crystalline domains (nanocrystals) in the cellulose nanofibrils. Extensive hydrogen bonding among the cellulose polymer chains makes cellulose extremely resistant to dissolution in water and most organic solvents, and even many types of acids.

As shown in FIG. 1, cellulose fibers are made of fibrils. Those fibrils are basically bundles of nanofibrils, each nanofibril containing crystalline cellulose domains separated by amorphous cellulose domains. These crystalline cellulose domains can be liberated by removing the amorphous cellulose domains, which yields cellulose nanocrystals.

As shown in FIG. 1, cellulose nanocrystals significantly differ from cellulose nanofibrils, also called cellulose nanofibers, (CNF). Indeed, CNF and CNC differ in both chemical nature and size. CNF comprises both amorphous and crystalline cellulose, while cellulose nanocrystals (CNC) are, as indicated by their name, crystalline. Furthermore, while CNF and CNC have both similar diameters, they differ in length: CNF being longer than CNC, the latter being typically 100-300 nm in length. It is generally known that cellulose, including CNFs and CNCs, is insoluble in water and typical organic substances.

Cellulose can be separated into its constituting cellulose nanofibrils (CNF), or alternatively can be converted into cellulose nanocrystals (CNC). Various methods of producing CNFs and CNCs are known.

CNFs can be produced by TEMPO-oxidation and then applying high shear force to separate the cellulose fibrils into their constituting nanofibrils. This method produces oxidized CNFs, i.e. carboxylated CNFs, which are CNFs with surface carboxyl/carboxylate groups.

One method of producing CNCs is described in WO2016015148A1, incorporated herein by reference. This method uses a peroxide together with heat and/or UV to both hydrolyse and oxidize the cellulose. This method produces oxidized CNCs, i.e. carboxylated CNCs, which are CNCs with surface carboxylic (COOH) groups or salts thereof.

WO2016015148A1 also describes that such CNCs can be spray dried to produce microparticles comprised of the CNCs. As will be shown below, once dried these carboxylated CNC microparticles cannot easily be redispersed in aqueous or non-aqueous solvents. The ability of dried CNC microparticles to be nanoredispersed, i.e. having their constituting CNCs separated from one another, is very desirable for some applications, and less desirable for other applications.

It is known that nanoscale dispersions of guest nanoparticles/nanofibers into a host matrix, like a polymer or a cement, can confer desirable properties on the guest-host system. Examples of such desirable properties are improved mechanical properties at very low concentrations of nanoparticles and modification of thermal properties, like changes in the glass transition of host organic polymers.

It is also known that it is difficult to obtain nanoscale particles from aggregates thereof. A significant challenge to achieve the desired performance lies in attaining homogeneous dispersion of nanocrystals within the host matrix. Solvent dispersion, while standard practice for agglomerates, is difficult to achieve at the nanoscale. More generally, it is known that cellulose microfibrils, CNFs and CNCs are not efficiently nanoredispersible in solvents once they have been dried. Indeed, low yields are observed, and/or a lot of energy must be used (e.g. high-pressure homogenizers used for very long periods of time). However, a few methods are known to improve the nanoredispersibility of cellulose microfibrils and TEMPO-oxidized CNFs in water. In particular, a method is known to improve the nanoredispersibility of dried CNFs in water, namely by oxidizing TEMPO-oxidized CNFs with $NaO_2Cl$ or $NaOCl/NaO_2Cl$, or by reducing such CNFs with $NaBH_4$.

On another subject, it is known that CNCs can be used as additives in cement paste compositions and the resulting cured cement pastes. It has been demonstrated that adding CNCs to cement paste compositions may improve the properties thereof.

SUMMARY OF THE INVENTION

In accordance with the present invention, there is provided:

1. A cellulose microparticle comprising dried cellulose nanocrystals agglomerated together and forming said microparticle, wherein the CNCs are surfaced-reduced carboxylated CNCs, and wherein the microparticle is nanoredispersible into its constituting cellulose nanocrystals in both at least one aqueous solvent and at least one non-aqueous solvent.
2. The microparticle of item 1, wherein the microparticle is nanoredispersible in water and ethylene glycol.
3. The microparticle of item 1 or 2, wherein the microparticle is nanoredispersible in water, ethylene glycol, and mixtures thereof.
4. The microparticle of any one of items 1 to 3, wherein the nanoredispersibility of the microparticle is at least about 45 wt % in each of the at least one aqueous solvent, preferably water, and the at least one non-aqueous solvent, preferably ethylene glycol.

5. The microparticle of any one of items 1 to 4, wherein the nanoredispersibility of the microparticle in the at least one aqueous solvent, preferably water, is at least about 90 wt %, at least about 95 wt %, at least about 99 wt %, or at least about 99.5 wt %.
6. The microparticle of any one of items 1 to 5, wherein the nanoredispersibility of the microparticle in the at least one non-aqueous solvent, preferably ethylene glycol, is at least about 45 wt %, at least about 50 wt %, at least about 55%, or at least about 60 wt %.
7. The microparticle of any one of items 1 to 6, wherein more than about 90%, preferably more than about 95%, more preferably more than about 97%, yet more preferably more than about 99%, and even more preferably more than about 99.5% of cellulose repeat units at a surface of the surface-reduced carboxylated CNCs bear hydroxyl groups at the C2 and C3 position of the cellulose and hydroxyl or carboxyl/carboxylate groups at the C6 position of the cellulose.
8. The microparticle of any one of items 1 to 7, wherein the microparticle has an average size of about 1 μm to about 20 μm in diameter.
9. The microparticle of any one of items 1 to 8, wherein the microparticle has an average diameter of: at least about 1 μm; at least about 2 μm; at least about 4 μm; or at least about 5 μm; and/or at most about 20 μm; at most about 15 μm; at most about 12 μm; or at most about 10 μm.
10. The microparticle of any one of items 1 to 9, wherein the CNCs forming the microparticle have average dimensions in width of about 2 nm to about 20 nm and in length of about 80 nm to about 250 nm.
11. The microparticle of any one of items 1 to 10, wherein the CNCs forming the microparticle have average dimensions in width of about 5 nm to about 10 nm and in length of about 150 nm to about 200 nm.
12. The microparticle of any one of items 1 to 11, wherein the microparticle comprises one or more additives.
13. The microparticle of item 12, wherein each individual additive is present in an amount of at most about 20 wt %, based on the total weight of the microparticle.
14. The microparticle of item 12 or 13, wherein all additives are present in an amount of at most about 20 wt %, based on the total weight of the microparticle.
15. The microparticle of any one of items 12 to 14, wherein the one or more additives is:
   an organic acid like citric acid, lactic acid, maleic acid, an aldonic acid (glyceric acid, xylonic acid, gluconic acid, ascorbic acid), an alsonic acid (like neuraminic acid, 3-Deoxy-D-manno-oct-2-ulosonic acid), an uronic acid (like glucuronic acid, galacturonic acid, iduronic acid), an aldaric acid (like tartaric acid, mucic acid, saccharic acid), or carboxyinulin (a heterogeneous collection of fructose polymers);
   an acrylate polymer, preferably a polymer of acrylic or methacrylic acid, a copolymer of methacrylic acid or acrylic acid, or a polymer from the class of polymers that are identified by the trade name Eudragit™ and sold by Evonik, such as an araminoalkylmethacrylate copolymer, a methacrylic acid copolymer, an ammonioalkylmethacrylate copolymer, or a methacrylic ester copolymer;
   a water soluble polymer like polyvinyl alcohol, a poly(ethylene oxide) polymer (like Polyox™ sold by Dow), carboxymethyl cellulose, hydroxypropylethylcellulose, polyanionic cellulose, hydroxypropylmethyl cellulose, water soluble cellulose acetate, poly(acrylamide), or a soluble cellulose ether like Methocel™ sold by Dow; or
   a combination thereof.
16. The microparticle of any one of items 1 to 11, wherein the microparticle is free of additives.
17. A method for producing microparticles as defined in any one of items 1 to 16, comprising the steps of:
   a. reducing carboxylated CNCs to produce surface-reduced carboxylated CNCs;
   b. producing an aqueous suspension of the surface-reduced carboxylated CNCs; and
   c. spray-drying the aqueous suspension of the surface-reduced carboxylated CNCs, thereby producing the microparticles,
wherein the spray-drying is performed using a spray-dryer operating with an inlet temperature of about 140° C. to about 160° C. and an outlet temperature of about 65° C. to about 75° C.
18. The method according to item 17, wherein the CNCs have average dimensions in width of about 2 nm to about 20 nm and in length of about 80 nm to about 250 nm.
19. The method according to item 17 or 18, wherein the CNCs have average dimensions in width of about 5 nm to about 10 nm and in length of about 150 nm to about 200 nm.
20. The method according to any one of items 17 to 19, wherein carboxylated CNCs that have never been dried are used in reduction step a).
21. The method according to any one of items 17 to 20, wherein the method further comprises the step of, before the reduction step a), providing an aqueous suspension of carboxylated CNCs that have not been allowed to dry after their production.
22. The method according to any one of items 17 to 19, wherein carboxylated CNCs that have been dried are used.
23. The method according to item 22, wherein the carboxylated CNCs that have been dried are redispersed as a suspension before the reduction step a).
24. The method according to item 23, wherein the carboxylated CNCs that have been dried are DextraCel™, preferably the CNC microparticles sold as ChromaPur Neige™.
25. The method according to any one of items 17 to 24, wherein the method further comprises, before reducing step a), the step of providing an aqueous suspension of the carboxylated CNCs.
26. The method according to item 25, wherein the aqueous suspension of carboxylated CNCs is a carboxylated CNC suspension yielded by a carboxylated CNC production process and purified as needed.
27. The method according to item 25, wherein the aqueous suspension of carboxylated CNCs is prepared by redispersing dried carboxylated CNCs.
28. The method according to any one of items 17 to 27, wherein the carboxylated CNCs are reduced using a reducing agent.
29. The method according to item 28, wherein the carboxylated CNCs are reduced using a $NaBH_4$ solution.
30. The method according to item 28, wherein the carboxylated CNCs are reduced using a $NaBH_4$ powder.
31. The method according to any one of items 28 to 30, wherein the reducing agent is used in an amount corresponding to:
   at least about 0.1% of the dry carboxylated CNC weight;
   at least about 0.5% of the dry carboxylated CNC weight; at least about 0.75% of the dry carboxylated CNC weight; or at least about 1% of the dry carboxylated CNC weight; and/or at most about 15% of the dry carboxylated CNC weight; at most about 10% of the dry carboxylated CNC weight; at most about 7% of the dry carboxylated CNC weight; or at most about 5% of the dry carboxylated CNC weight.

32. The method according to any one of items 28 to 31, wherein the reducing agent is used in an amount corresponding to about 3% the dry carboxylated CNC weight.

33. The method according to any one of items 25 to 32, wherein the concentration of the aqueous suspension of carboxylated CNCs is:

at least about 0.01% by weight; at least about 0.1% by weight; at least about 0.5% by weight; or at least about 1% by weight; and/or at most about 10% by weight; at most about 8% by weight; at most about 6% by weight; or at most about 5% by weight.

34. The method according to any one of items 25 to 33, wherein the concentration of the aqueous suspension of carboxylated CNCs is about 3% by weight.

35. The method according to any one of items 25 to 34, wherein the method further comprises the step of adjusting the pH of the aqueous suspension of carboxylated CNCs to at least about 9 before the reduction step a).

36. The method according to item 35, wherein the pH of the aqueous suspension of carboxylated CNCs is adjusted using a basic solution.

37. The method according to item 36, wherein the pH of the aqueous suspension of carboxylated CNCs is adjusted with NaOH, preferably about 10 wt % aqueous solution of NaOH.

38. The method according to item 36 or 37, wherein the basic solution is added dropwise to the aqueous suspension of carboxylated CNCs.

39. The method according to any one of items 28 to 38, wherein an about 4.4M $NaBH_4$ solution in about 14M aqueous NaOH is used as the reducing agent.

40. The method according to any one of items 28 to 39, wherein the reducing agent is added dropwise to the aqueous suspension of carboxylated CNCs under constant stirring.

41. The method according to any one of items 28 to 40, wherein, after the reducing agent is added, the aqueous suspension of carboxylated CNCs is stirred for at least about 1 hour; at least about 3 hours; at least about 10 hours; or at least about 16 hours.

42. The method according to any one of items 17 to 41, wherein reducing step a) produces an aqueous suspension of the surface-reduced carboxylated CNCs.

43. The method according to any one of items 17 to 42, wherein, during step b), the reaction mixture produced during step a) is purified.

44. The method according to item 43, wherein reaction mixture produced during step a) is purified using diafiltration.

45. The method according to item 44, wherein reaction mixture produced during step a) is purified using diafiltration until the conductivity of the filtrate drops below 30 μS/cm.

46. The method according to any one of items 17 to 45, wherein reaction mixture produced during step a) or the aqueous suspension of the surface-reduced carboxylated CNCs produced in step b) is stored in a closed container before spray-drying step c).

47. The method according to any one of items 17 to 46, wherein the surface-reduced carboxylated CNCs are spray-dried in step c) using an inlet temperature of: at least about 140° C., at least about 145° C., or at least about 150° C. and/or at most about 160° C.; at most about 155° C., or at most about 150° C.

48. The method according to any one of items 17 to 47, wherein the aqueous suspension is spray-dried in step c) using an inlet temperature of about 150° C.

49. The method according to any one of items 17 to 48, wherein the aqueous suspension is spray-dried in step c) using an outlet temperature of:

at least about 65° C., or at least about 70° C.; and/or
at most about 75° C.; or at most about 70° C.

50. The method according to any one of items 17 to 49, wherein the aqueous suspension is spray-dried in step c) using an outlet temperature of about 70° C.

51. The method according to any one of items 17 to 50, wherein the aqueous suspension is spray-dried in step c) using an inlet temperature of about 150° C. and an outlet temperature of about 70° C.

52. The microparticles as defined in any one of items 1 to 16 for use as an additive in cement paste compositions.

53. The microparticles as defined in any one of items 1 to 16 for use as an additive in cured cement pastes.

54. A cement paste composition comprising the microparticles as defined in any one of items 1 to 16.

55. A cured cement paste comprising the microparticles as defined in any one of items 1 to 16.

56. The microparticles as defined in any one of items 1 to 16 for use as an additive in water-based paint formulations.

57. A water-based paint formulation comprising the microparticles as defined in any one of items 1 to 16.

58. The water-based paint formulation of item 57, further comprising hydroxyethyl cellulose (HEC) and/or aqueous latex particles.

59. The microparticles as defined in any one of items 1 to 16 for use in a polymer composite.

60. A polymer composite part comprising the microparticles as defined in any one of items 1 to 16 dispersed in a polymer.

61. The polymer composite of item 60, wherein the polymer is a polyurethane, a foamed polyurethane, a gelatin film, a poly(vinylpyrolidone) (such as Povidone and Crospovidone), a plastic starch, or a specialty cellulose polymer (such as a cellulose ether or a c cellulose ester.

DETAILED DESCRIPTION OF THE INVENTION

Figure 1:
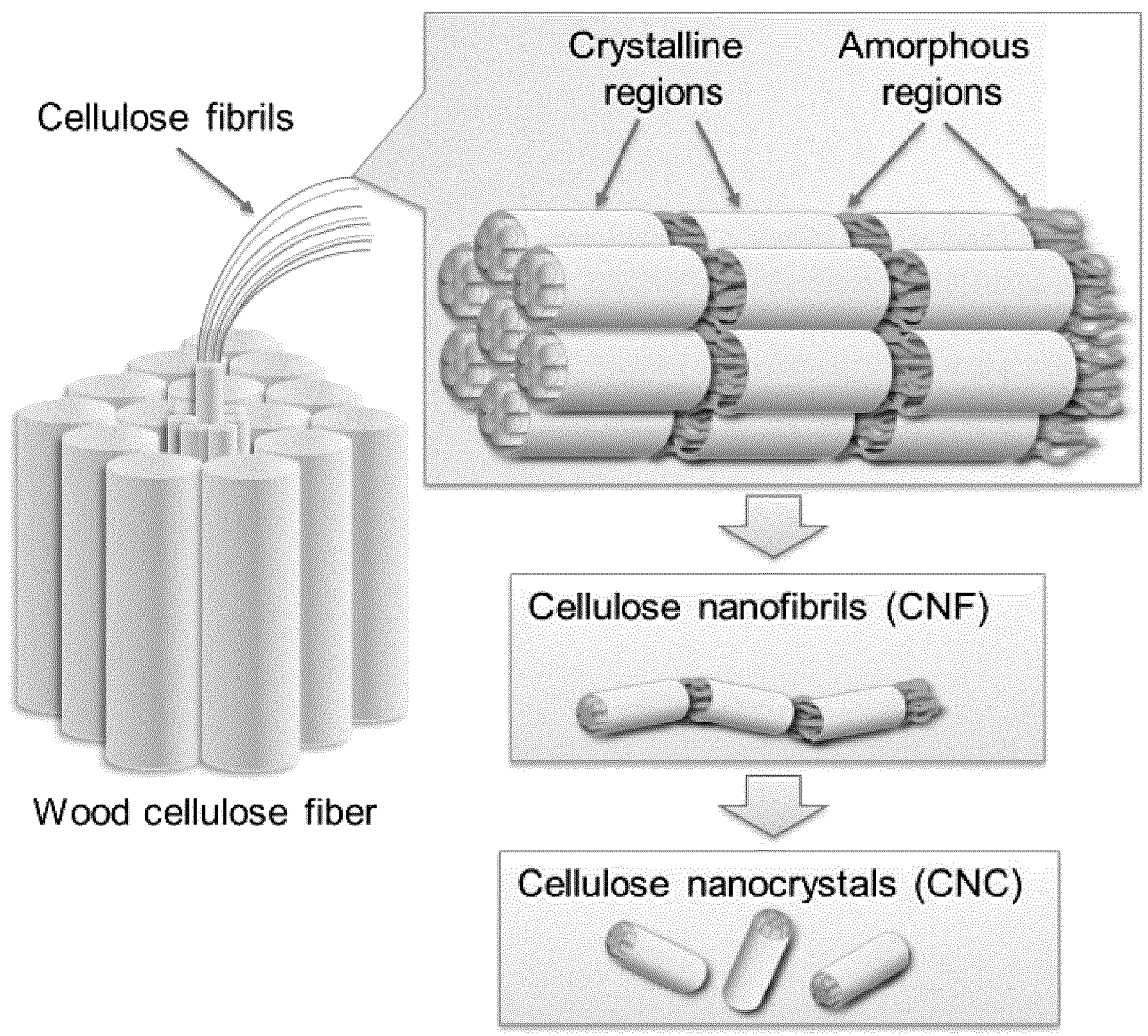
FIG. 1 is a schematic representation of cellulose and its derivatives: cellulose CNFs and CNCs.

The present inventors have found a way to make nanoredispersible microparticles starting from carboxylated CNCs.

Turning to the invention in more detail, there is provided a cellulose microparticle nanoredispersible into its constituting cellulose nanocrystals in both at least one aqueous solvent and in at least one non-aqueous solvent as well as a method for producing said nanoredispersible microparticle.

Nanoredispersible Microparticles Comprised of Dried CNCs

In a first aspect of the invention, a cellulose microparticle comprising dried cellulose nanocrystals agglomerated together and forming said microparticle is provided, wherein the CNCs are surfaced-reduced carboxylated CNCs, and wherein the microparticle is nanoredispersible into its constituting cellulose nanocrystals in both at least one aqueous solvent and in at least one non-aqueous solvent.

The term "nanoredispersibility" refers to the capacity of a material to disintegrate and redisperse into its constituting nanoscale subcomponents when put in contact with a solvent. In the case of the present microparticle, nanoredispersibility refers to the microparticle's ability to disintegrate and redisperse into its constituting cellulose nanocrystals.

It is highly advantageous that the microparticle of the invention be nanoredispersible in both at least one aqueous solvent and in at least one non-aqueous solvent. Indeed, packaging, shipping, and storing suspensions is quite impractical for several reasons. With the microparticle of the invention, CNCs can be provided in a dry form and redispersed as needed for use in either aqueous or non-aqueous solvents. In other words, the microparticle of the invention is a source of CNCs that can be used in a large variety of applications, including those requiring aqueous solvents and those requiring non-aqueous solvents.

The CNCs in the microparticle of the invention are agglomerated together and form the microparticle. This means that the physical structure of the microparticles is provided by the agglomerated CNCs. In other words, while the microparticle can contain optional additives as described below, those are present only in minor amounts and it is the CNCs that provide the structure of the microparticles.

The microparticle of the present invention comprises dried cellulose nanocrystals. The prior art teaches that microparticles made from carboxylated CNCs cannot effectively be nanoredispersed, let alone nanoredispersed in at least one aqueous solvent and in at least one non-aqueous solvent. According to the prior art, this is because the carboxylated CNCs therein have been dried (e.g. as part of the process for making the microparticles).

The microparticle of the present invention has the advantage of being nanoredispersible, and even having high nanoredispersibility, despite being comprised of dried carboxylated cellulose nanocrystals. The microparticles of the present invention also have the advantage of being nanoredispersible in at least one aqueous solvent, preferably water, and at least one non-aqueous solvents, preferably ethylene glycol. As shown in the examples reported below, this is due:

to the fact that the CNCs in the microparticles are surfaced-reduced and bear hydroxyl groups at the C2, C3, and/or C6 position of the cellulose and, to the drying process used to produce the microparticles. Both of these will be discussed in the present section and in the next section.

The nanoredispersibility of the microparticles in a given solvent can be calculated from the weight of the cellulose nanocrystals that are dispersed in the solvent after mixing the microparticles in the solvent for about 16 hours, followed by 15 min of sonication using a probe, using the following equation:

$$\text{Nanoredispersibility (wt \%)} = \frac{W_{redispered}}{W_{CNCs}} \times 100$$

wherein $W_{redispersed}$ is the weight of the cellulose nanocrystals that are redispersed after mixing and sonication as per the above method, and $W_{CNCs}$ is the total weight of the cellulose nanocrystals in the microparticles. When the microparticles are comprised of pure cellulose nanocrystals (i.e. the microparticles do not includes additives), $W_{CNCs}$ is simply the weight of the microparticles.

In preferred embodiments, the microparticles are nanoredispersible in water and ethylene glycol. In embodiments, the microparticles are nanoredispersible in water, ethylene glycol, and mixtures thereof.

In embodiments, the nanoredispersibility of the microparticles is at least about 45 wt % in each of the at least one aqueous solvent, preferably water, and at least one non-aqueous solvent, preferably ethylene glycol.

In embodiments, the nanoredispersibility of the microparticles in the at least one aqueous solvent, preferably water, as measured per the above method, is at least about 90 wt %, at least about 95 wt %, at least about 99 wt %, or at least about 99.5 wt %.

In embodiments, the nanoredispersibility of the microparticles in the at least one non-aqueous solvent, preferably ethylene glycol, as measured per the above method, is at least about 45 wt %, at least about 50 wt %, at least about 55%, or at least about 60 wt %.

In general, the microparticles of the present invention tend to possess higher nanoredispersibility in aqueous solvents than in non-aqueous solvents like ethylene glycol.

As mentioned above, carboxylated CNCs (for example when produced as described in WO2016015148A1, which is incorporated herein by reference) are at least partially surface oxidized and thus bear on their surface:

at position C2 of the cellulose: hydroxyl and ketone groups, at position C3 of the cellulose: hydroxyl and ketone groups, and at the C6 position of the cellulose: hydroxyl, aldehyde, and carboxyl/carboxylate groups.

A skilled person will understand that, since several functional groups are listed for each position of the cellulose, different repeat units of the cellulose will bear the different functional groups listed and that, overall, the surface of the CNCs will bear all of the listed functional groups.

In the microparticles of the invention, the CNCs are surface-reduced carboxylated CNCs. In other words, the CNCs are carboxylated CNCs that have been surface-reduced. This surface reduction means that, on their surface, the aldehyde groups at the C6 position, the ketone groups at the C2 and/C3 positions, and at least some, preferably most, of the carboxyl or carboxylate groups at the C6 position have been reduced into hydroxyl groups. This means that that surface-reduced carboxylated CNCs bear on their surface:
- at the C2 and C3 position of the cellulose: hydroxyl groups, and
- at the C6 position of the cellulose: hydroxyl or carboxyl/carboxylate groups.

A skilled person will understand that, as with any other chemical reaction, the surface reduction might not be perfectly complete and that some residual C6-aldehydes and/or C2/C3-ketones may be present in the surface-reduced carboxylated CNCs of the microparticles of the invention. However, the skilled person will also understand that the present surface-reduced carboxylated CNCs are carboxylated CNCs that have been surface reduced in conditions such that the reduction is effectively carried out. In preferred embodiments, more than about 90%, preferably more than about 95%, more preferably more than about 97%, yet more preferably more than about 99%, and even more preferably more than about 99.5% of the cellulose repeat units at the surface of the surface-reduced carboxylated CNCs bear hydroxyl groups at the C2 and C3 position of the cellulose and hydroxyl or carboxyl/carboxylate groups at the C6 position of the cellulose. As shown in the example below, the surface reduction of carboxylated CNCs increases the nanoredispersibility of the microparticles of the invention.

Typically, the microparticles of the present invention have an average size of about 1 μm to about 20 μm in diameter. In embodiments, the microparticles have an average diameter of:
- at least about 1 μm; at least about 2 μm; at least about 4 μm; or at least about 5 μm; and/or
- at most about 20 μm; at most about 15 μm; at most about 12 μm; or at most about 10 μm.

The CNCs forming the microparticles typically have average dimensions in width of about 2 nm to about 20 nm and in length, about 80 nm to about 250 nm, for example average dimensions in width of about 5 nm to about 10 nm and in length, about 150 nm to about 200 nm.

As noted above, the microparticle of the invention can comprise one or more additives. Any individual additive can be present in an amount of at most about 20 wt %, based on the total weight of the microparticle. Together, all of the additives can be present in an amount of at most about 20 wt %, based on the total weight of the microparticle. Non-limiting examples of additives include organic acids like citric acid, lactic acid, maleic acid, any of the aldonic acids (glyceric acid, xylonic acid, gluconic acid, ascorbic acid), any of the alsonic acids (like neuraminic acid, 3-Deoxy-D-manno-oct-2-ulosonic acid), any of the uronic acids (like glucuronic acid, galacturonic acid, iduronic acid), any of the aldaric acids (like tartaric acid, mucic acid, saccharic acid), carboxyinulin (a heterogeneous collection of fructose polymers), or combinations thereof. Other additives may include polymers of acrylic or methacrylic acid, or copolymers of methacrylic acid or acrylic acid. Other acrylate polymers may be included as additives. For example, the class of polymers that are identified by the trade name Eudragit™ and sold by Evonik may be included as additives. Examples include aminoalkylmethacrylate copolymers, methacrylic acid copolymers, ammonioalkylmethacrylate copolymers, and methacrylic ester copolymers. Other polymers may include water soluble polymers like polyvinyl alcohol, poly (ethylene oxide) polymers (like Polyox™ sold by Dow), carboxymethyl cellulose, hydroxypropylethylcellulose, polyanionic cellulose, hydroxypropylmethyl cellulose, water soluble cellulose acetate, poly(acrylamide), soluble cellulose ethers like Methocel™ sold by Dow, and others well-known in the art.

During nanoredispersion of the microparticles of the present invention, the additives may provide additional benefits. For example, hydroxypropylethyl cellulose and hydroxypropylmethylcellulose may be released during nanodispersion, which may provide benefits to the cement industry by improving water retention, strength, consistency, workability, open time, yield point, and shear thinning behavior. These polymers, and others, may act synergistically with CNCs to improve properties such as abrasion resistance, water retention, strength, consistency, workability, open time, yield point and shear thinning behavior.

In preferred embodiments, the microparticle of the invention is free of additives. In other words, the microparticle consists of the CNCs.

Method of Producing Nanoredispersible Microparticles Comprised of Dried CNCs

In a second aspect of the invention, a method for producing the above microparticles is provided. As noted above, these microparticles are nanoredispersible in both at least one aqueous solvent and in at least one non-aqueous solvent:
- because the CNCs in the microparticles are surfaced-reduced and bear hydroxyl groups at the C2, C3, and/or C6 position of the cellulose and,
- because of the drying process used to produce the microparticles.

The method for producing the microparticles thus comprises the steps of:
a) reducing carboxylated CNCs to produce surface-reduced carboxylated CNCs;
b) producing an aqueous suspension of the surface-reduced carboxylated CNCs; and
c) spray-drying the aqueous suspension of the surface-reduced carboxylated CNCs, thereby producing the microparticles, wherein the spray-drying is performed using a spray-dryer operating with an inlet temperature of about 140° C. to about 160° C. and an outlet temperature of about 65° C. to about 75° C.

Starting Material

Any known carboxylated CNCs can be used as a starting material. In embodiments, these CNCs are produced using the method described in WO2016015148A1, incorporated herein by reference.

As mentioned in the previous section, CNCs typically have average dimensions in width of about 2 nm to about 20 nm and in length, or about 80 nm to about 250 nm, for example dimensions in width of about 5 nm to 10 about nm and in length, of about 150 nm to 200 nm. This applies to both the surface-reduced carboxylated CNCs once they are spray-dried, as well as the carboxylated CNCs used as a starting material.

As mentioned above, carboxylated CNCs once they have been dried cannot effectively be nanoredispersed. It is therefore advantageous to use carboxylated CNCs that have never been dried. In such embodiments, the CNC suspension yielded by the carboxylated CNCs production process (e.g. the peroxide hydrolysis of WO2016015148A1, or others) is purified as needed and used as the starting material in reduction step a). Hence, in embodiments, the method of the invention includes the step of providing an aqueous suspension of carboxylated CNCs that have not been allowed to dry (i.e. were kept wet at all times, e.g. suspended in a solvent) after their production.

In alternative embodiments, carboxylated CNCs that have been dried can be used. However, for use in the reduction step a), these carboxylated CNCs are preferably redispersed as a suspension. As noted above, this redispersion process is difficult and non-efficient, necessitates the assistance of high power for long times, and wastes large amounts CNCs (those CNCs that, even after such efforts, have not redispersed but have rather stayed aggregated). Nevertheless, this process can be used as the carboxylated CNCs that do redisperse are amenable to further processing such as reduction step a). In preferred such embodiments, the carboxylated CNCs are those commercially available from Anomera Inc. Canada as DextraCel™, and preferably the CNC microparticles sold as ChromaPur Neige™

Reduction Step a)

For the reduction reaction, the carboxylated CNCs are preferably provided as an aqueous suspension. Hence, in embodiments, the method includes before the reducing step a), the step of providing an aqueous suspension of the carboxylated CNCs used as a starting material. As described above, this aqueous suspension is preferably a carboxylated CNC suspension yielded by a carboxylated CNC production process, never dried, and purified as needed.

Reducing step a) should be conducted in such a manner as to reduce as many C6-aldehydes and C2/C3 ketones present in the carboxylated CNCs surface as possible. This will improve the nanoredispersibility of the resulting microparticles. Preferred conditions are described below.

The carboxylated CNCs can be reduced using any known reducing agent that will not adversely react with the carboxylated CNCs or any other substance in the suspension. In preferred embodiments, the carboxylated CNCs are reduced using a $NaBH_4$ solution.

In preferred embodiments, the reducing agent is used in an amount corresponding to:
- at least about 0.1% of the dry carboxylated CNC weight; at least about 0.5% of the dry carboxylated CNC weight; at least about 0.75% of the dry carboxylated CNC weight; or at least about 1% of the dry carboxylated CNC weight; and/or
- at most about 15% of the dry carboxylated CNC weight; at most about 10% of the dry carboxylated CNC weight; at most about 7% of the dry carboxylated CNC weight; or at most about 5% of the dry carboxylated CNC weight.

Preferably, the reducing agent is used in an amount corresponding to about 3% the dry carboxylated CNC weight.

The carboxylated CNC aqueous suspension may have a broad range of concentrations. In embodiments, the concentration of the carboxylated CNC aqueous suspension is:
- at least about 0.01% by weight; at least about 0.1% by weight; at least about 0.5% by weight; or at least about 1% by weight; and/or
- at most about 10% by weight; at most about 8% by weight; at most about 6% by weight; or at most about 5% by weight.

In a preferred embodiment, the concentration of the carboxylated CNC aqueous suspension is about 3% by weight.

In some cases, carboxylated CNCs are provided with a pH (in aqueous suspension) that is acidic, for example about 2.5. In preferred embodiments, to optimize the number of reductions, the method comprises, as needed, the step of adjusting the pH of the carboxylated CNC aqueous suspension used as a starting material to at least about 9. The pH of an acidic carboxylated CNC suspension can be adjusted using any basic solution that will not adversely react with the carboxylated CNCs or any other substance in the suspension (e.g. a reducing agent). In embodiments, the pH of the carboxylated CNC suspension is adjusted with NaOH, preferably about 10 wt % aqueous solution of NaOH. In embodiments, the NaOH is added dropwise to the carboxylated CNC suspension.

The concentration and pH of the reducing agent may vary, bearing in mind that it is preferable to reduce as many of the carboxylated CNCs as possible. Preferably, an about 4.4M $NaBH_4$ solution in about 14M aqueous NaOH is used, or a $NaBH_4$ powder. It should be understood that the reduction of the carboxylated CNCs with $NaBH_4$ is a robust reaction that can occur using a wide variety of pH levels and concentrations.

The reducing agent can be added to the carboxylated CNC suspension using any method known in the art that will promote reduction of the C6-aldehydes and C2/C3 ketones present in the carboxylated CNCs. In embodiments, the reducing agent is added dropwise to the carboxylated CNC suspension under constant stirring.

After addition of the reducing agent, the suspension should be stirred for a sufficient amount of time in order to allow the reaction to proceed, e.g. reduce as many C6-aldehydes and C2/C3 ketones present in the carboxylated CNCs as possible. In embodiments, the suspension is stirred for at least about 1 hour; at least about 3 hours; at least about 10 hours; or at least about 16 hours. It is to be understood that increased stirring time will typically increase the number of reductions.

Reducing step a) described above produces surface-reduced carboxylated CNCs, preferably as a suspension, more preferably as an aqueous suspension.

Suspension Step b)

The next step is to produce an aqueous suspension of the surface-reduced carboxylated CNCs.

In embodiments, this aqueous suspension is free of the reactants used in reduction step a). Ideally, this suspension would consist of the aqueous solvent, the surface-reduced carboxylated CNCs, and any desired additives (as described in the previous section). In preferred embodiments, suspension step b) comprises purifying the reaction mixture produced in step a) to form the aqueous suspension of the surface-reduced carboxylated CNCs desired in step b).

Purification can be performed using any known method in the art that will not adversely react with the surface-reduced carboxylated CNCs. In embodiments, the purification is performed using diafiltration of the reaction mixture produced in step a). In preferred embodiments, this reaction mixture is purified using diafiltration until the conductivity of the filtrate drops below about 30 µS/cm.

In alternative embodiments, the reaction mixture resulting from step a) can be used as the aqueous suspension of the surface-reduced carboxylated CNCs of step b) and by directly spray-dried as per step c).

Optional Storage Step

In embodiments, the reaction mixture produced in step a) or, preferably, the aqueous suspension of the surface-reduced carboxylated CNCs produced in step b) is stored in a closed container before spray-drying step c).

Spray-Drying Step c)

As mentioned, the carboxylated CNCs of the present invention are spray-dried after being surface reduced to form the microparticles.

Figure 2:
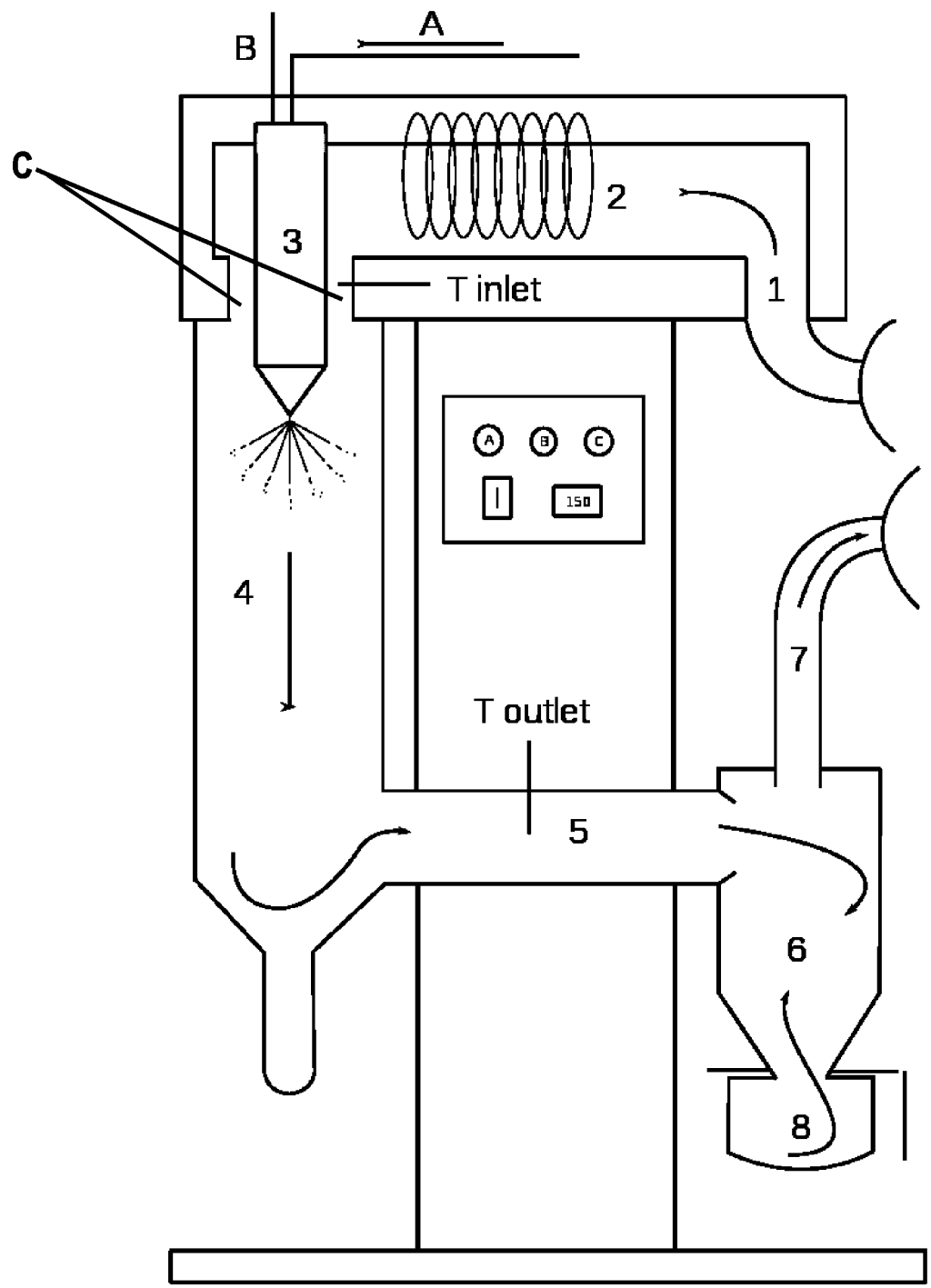
FIG. 2 is a schematic representation of a typical laboratory-scale spray-dryer.

FIG. 2 shows a schematic representation of a typical laboratory-scale spray-dryer [Laboratory-scale spray dryer (https://commons.wikimedia.org/wiki/File:Labspraydryer.svg) by Teemu Pelkomen is used under the Creative Common Attribution-Share Alide 3.0 Unported license (https://creativecommons.org/licenses/by-sa/3.0/deed.en)]. The arrows in FIG. 2 indicate flow direction.

A typical spray drier comprises an atomizer or spray nozzle (3) which is being fed a solution or suspension to be dried through a solution or suspension inlet (A) and fed an atomization gas through an atomization gas inlet (B). The nozzle extends in a drying chamber (4). The drying chamber (4) is provided with a heated drying gas inlet (C) and with an outlet (5) connected to a solid/gas separator (6), such as a cyclone. The solid/gas separator is typically provided with a collection vessel (8) for the dried material and a drying gas exhaust (7). The heated drying gas is typically first fed to a drying gas heating chamber of the spray drier through a drying gas inlet (1). The drying gas heating chamber is equipped with a heating element (2) to heat the drying gas. The heated drying gas then flows into the drying chamber (4) through the heated drying gas inlet (C).

In co-current flow spray-driers, the heated drying gas inlet (C) is close to the atomizer or spray nozzle (3), while the outlet (5) is provided on the side of the drying chamber (4) opposite the atomizer or spray nozzle (3) as shown in FIG. 2. In a counter-current flow spray-dryer (not shown), the outlet (5) is close to the atomizer or spray nozzle (3), while the heated drying gas inlet (C) is provided on the side of the drying chamber (4) opposite the atomizer or spray nozzle (3).

During spray-drying, a feed pump (not shown) is used to impel the fluid solution or suspension to be dried towards the drying chamber (4). The fluid solution or suspension is sprayed through the atomizer or spray nozzle (3), which forms the microparticles. The high temperature within the drying chamber (4), combined with high pressure expulsion of an aerosol of micro-droplets of the fluid solution or suspension, causes near-instantaneous evaporation of the liquid from the fluid solution or suspension, creating the desired microparticles. A fan, or other source of moderate vacuum (not shown), is used to draw the liquid vapour and microparticles from the drying chamber to solid/gas separator (6) where the microparticles are separated from liquid vapour. The liquid vapour is exhausted from the system, while the microparticles are collected.

When operating a spray-drier, an "inlet temperature" is defined as the temperature of the drying gas entering the drying chamber through the inlet provided therefor. Similarly, an "outlet temperature" is defined as the temperature of the liquid vapor and microparticles mixture exiting the drying chamber through the outlet provided therefor.

The inventors discovered that spray-drying surface-reduced carboxylated CNCs at lower temperatures than those typically used in the art unexpectedly improved nanoredispersibility of the resulting microparticles. Accordingly, as noted above, in the method of the invention the aqueous suspension of the surface-reduced carboxylated CNCs is spray-dried using a spray-dryer operating with an inlet temperature of about 140° C. to about 160° C. and an outlet temperature of about 65° C. to about 75° C.

In embodiments, the aqueous suspension is spray-dried using an inlet temperature of at least about 140° C., at least about 145° C., or least about 150° C.; and/or at most about 160° C., at most about 155° C., or at most about 150° C. In preferable embodiments, the aqueous suspension is spray-dried using an inlet temperature of about 150° C.

In embodiments, the aqueous suspension is spray-dried using an outlet temperature of at least about 65° C., at least about 70° C.; and/or at most about 75° C.; or at most about 70° C. In preferable embodiments, the aqueous suspension is spray-dried using an outlet temperature of about 70° C.

In more preferable embodiments, the aqueous suspension is spray-dried using an inlet temperature of about 150° C. and an outlet temperature of about 70° C.

An advantage of CNCs having been spray dried is that the CNCs are agglomerated into the microparticles. This makes it easier to package, ship, store and use the CNCs (compared to using suspensions). Another advantage of spray drying, in the case of the present invention, is that the CNCs can be aggregated into microparticles whose diameter can be controlled by process variables like pressure and temperature of the feed to the atomizer or spray nozzle.

Advantages of the Invention

The microparticles of the present invention are nanoredispersible, as discussed above. Further, in embodiments, the microparticles of the present invention can present one or more of the following advantages:

High nanoredispersibility in both aqueous and non-aqueous solvents;

Nanoredispersibility of up to about 99.5% in aqueous solvents.

Nanoredispersibility of at least about 60% in non-aqueous solvents.

Easier to package, ship, store and use when compared to never-dried CNCs (i.e. suspensions), while maintaining a high nanoredispersibility.

Ease of co-release of additives that may provide synergistic or functional benefits.

The method of the present invention produces the above-defined microparticles. In addition, in embodiments, the method of the present invention can present one or more of the following advantages:

The reduction reaction is robust.

The microparticles are produced by simple spray-drying.

The method utilizes a lower spray-drying temperature, and thereby utilizes less energy and is more cost-effective.

The method is relatively simple.

Potential Applications

The microparticles of the present application may also be used as an additive in aqueous or non-aqueous-based materials to form e.g. composite materials.

For example, the above-described microparticles can be used as additives in cement paste compositions and the resulting cured cement pastes. It has been demonstrated that adding CNCs to cement paste compositions may improve the properties thereof. These advantages may include increased mechanical strength, reduced yield points, and increased plasticization and workability. The microparticles can also be used as water reducing agents (WRAs).

The microparticles of the present application may also be used as an additive in water-based paint formulations. In embodiments, the microparticles can be added to water and water-based media containing other polymers suitable for paint industry applications. One example of such a polymer is hydroxyethyl cellulose (HEC), which can be used as a thickening agent for paints. In embodiments, the microparticles of the present invention can first be nanoredispersed and then mixed with a dispersion of HEC to modify rheology. Furthermore, the nanoredispersed particles can be mixed with aqueous latex particles, which are also used in paints.

As mentioned previously, in embodiments, the microparticles of the present invention are nanoredispersible in nonaqueous media.

For example, the microparticles can also be used with polymers to make polymer composites. Polymers for composites include polyurethane and foamed polyurethane, gelatin film, poly(vinylpyrolidone) such as povidone (polyvinylpyrrolidone) and crospovidone (polyvinylpolypyrrolidone) used in the food industry and pharmaceutical industries, plastic starches, and specialty cellulose polymers like cellulose ethers and cellulose esters. Urethane polymers containing cCNC are contemplated for use bedding, furniture, automotive interiors, carpet underlay, packaging, insulation, coatings, adhesives, sealants and elastomers, apparel, and others. cCNC combined with gelatin may enhance the structural properties of gelatin for film packaging.

In specific embodiments, the microparticles can be nanoredispersed in ethylene glycol, and the resulting ethylene glycol dispersion can be mixed with polyols that are used to make urethane foam composites, These can be, for example, used to make automobile parts like panels, bumpers and molded interiors, including seats. It will be apparent to those skilled in the art that other alcohols can be contemplated for this purpose. Non-limiting examples of other alcohols include alcohols containing either one or multiple hydroxyl groups. Examples of alcohol containing one hydroxyl group include ethanol, propanol, butanol and other aliphatic and aromatic alcohols liquid at room temperature and pressure of 1 atm. Examples of alcohols containing multiple hydroxyl groups include ethylene glycol, propylene glycol, butylene glycols and other aliphatic, aromatic and cycloalkyl alcohols liquid at room temperature and pressure of 1 atm. Examples also include liquid ethylene-oxide and propylene-oxide based polyols containing chain-end or side hydroxyl groups, as well as other polyols containing chain-end or side hydroxyl groups and remaining in liquid state at room temperature and pressure of 1 atm, including aliphatic polyether polyols, aliphatic polyester polyols, aromatic polyester polyols, aromatic polyether polyols.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1 and Comparative Examples 2-8

Specifically, microparticles of the invention (surface-reduced carboxylated CNCs spray-dried with lower inlet/outlet temperature) were prepared and their nanoredispersibility was measured in both water and ethylene glycol (see Example 1). This was compared with:

microparticles also comprising surface-reduced carboxylated CNCs spray-dried at higher inlet/outlet temperatures than those in Example 1 (see Example 3), microparticles comprising oxidized CNCs (i.e. not surface-reduced) spray-dried at higher inlet/outlet temperatures than the CNCs in Example 1 (see Example 2), and microparticles comprising oxidized CNCs (i.e. not surface-reduced) spray-dried at the same inlet/outlet temperatures than the CNCs in Example 1 (see Example 7).

Additional microparticles were produced, for all of the above conditions, using CNFs instead of CNCs (see Examples 4-6 and 8), and the nanoredispersibilities thereof in water and ethylene glycol were also measured for comparison with those obtained in Examples 1-3 and 7.

The results of Examples 1-8 are summarized in Tables 1 and 2, together with the result of Example 9 (similar to Example 1, but without purification step). It is clear that using surface-reduced carboxylated CNCs, combined with a lower spray-drying temperature of 150-70° C., improves the nanodispersibility of the resulting microparticles in both water and ethylene glycol. Specifically, the nanoredispersibility of the microparticles obtained (characterized either as the size after redispersion (smaller sizes =better redispersion) and as the % of redispersion) in Examples 1 and 9 were higher than those obtained in Examples 2-8, in both water and ethylene glycol.

Materials and Procedures

For each of Examples 1-3, a carboxylated CNC aqueous suspension was prepared and then, for Examples 1 and 3, reduced using sodium borohydride ($NaBH_4$) according to the following steps.

Preparation of CNC aqueous suspension: 6400 g of never dried carboxylated CNC aqueous suspension (containing 102.4 g of CNC, 1.6 wt %)), produced using the method described in WO2016015148A1, was constantly stirred at 1100 rpm at room temperature using a Fisher Scientific overhead stirrer with a Teflon stirring rod.

Reduction of CNC in suspension: The pH of the CNC aqueous suspension was measured using Cole-Parmer PC100 pH-meter. The pH of the suspension was 2.50. The pH of the suspension was adjusted using 10 wt % aqueous solution of NaOH added dropwise to reach a pH level of 9.20. Next, 18.5 ml of $NaBH_4$ stock solution (Alfa Aesar, 4.4M solution in 14M aqueous NaOH, 3.072 g of dry $NaBH_4$, 81 mmol, 3% of dry CNC weight) was added dropwise to the suspension under constant stirring. The pH level of the suspension raised to 11.80 after complete addition of NaBH₄ solution. The suspension was stirred at room temperature overnight (16 hours). The suspension was then thoroughly purified using diafiltration (until the conductivity of the filtrate dropped below 30 µS/cm) and stored in a closed container.

Comparative examples 4-6 involve CNFs as opposed to CNCs. The cellulose nanofibrils used in these comparative examples were TEMPO-oxidized cellulose nanofibrils (CNFs) received from the University of Maine Process Development Center, lot # 2017-FPL-CNF-102. The CNFs were received in a form of 1.1 wt % aqueous suspension. The carboxylate content of CNFs was 1.5 mmol of -COONa per gram dry CNF sodium form. The CNFs were used as received, without further purification.

For each of these comparative examples, a CNF suspension was prepared and then reduced using NaBH4 as follows:

Preparation of the CNF aqueous suspension: 6140 g of never dried TEMPO-CNF aqueous suspension (containing 67.5 g of CNF, =1.1 wt %) was constantly stirred at 1100 rpm at room temperature using Fisher Scientific overhead stirrer with Teflon stirring rod.

Reduction of the CNF Aqueous suspension: 6000 ml of deionized water was added to the suspension to reduce the viscosity of the original CNF suspension. The pH of the suspension was measured using a Cole-Parmer PC100 pH-meter. The pH of the suspension was 6.36. The pH of the suspension was adjusted using dilute aqueous solution of NaOH added dropwise to reach a final pH level of 10.01. Powder NaBH₄ (Merck KGaA, CAS# 16940-66-2, 1.35 g, 36 mmol, 2% of dry CNF weight) was added to the suspension under constant stirring. The suspension was stirred at room temperature for 3 hours (1100 rpm). The suspension was then thoroughly purified using diafiltration (until the conductivity of the filtrate dropped below 30 µS/cm) and stored in a closed container.

The resulting CNC or CNF suspensions were then spray-dried at various conditions, which are detailed below, to form microparticles.

The nanoredispersibility of the resulting microparticles was then measured in both water and ethylene glycol using to the following methods.

Redispersibility in water. In order to calculate nanoredispersibility in water, the microparticles comprised of spray-dried CNCs or CNFs were redispersed in water by mixing for about 16 hours. The mixed solution was then centrifuged, and the nanoredispersion percentage was measured based on the weight of the dried solid residue (i.e. non-dispersed CNCs) left in the tube, when compared to the weight of microparticles that was originally placed in water.

Redispersibility in ethylene glycol. In order to calculate nanoredispersibility in ethylene glycol, the microparticles comprised of spray-dried CNCs or CNFs were redispersed in ethylene glycol at 0.1% w/v by mixing for about 16 hours, followed by 15 min of sonication using a probe. The mixed solution was then centrifuged. The solid residue at the bottom of the centrifuge tubes was washed with acetone to remove residues of ethylene glycol, and left to dry at 45° C. for about 16 hours. The dried residue was then washed again using ethanol to help further remove ethylene glycol residue, and left to dry at 45° C. for about 16 hours. The resulting dried sample (i.e. non-dispersed CNCs) was weighed the following day. The nanoredispersion percentage was calculated based on the weight of the resulting dried sample compared to the weight of CNCs or CNFs originally mixed into the ethylene glycol.

Example 1—Microparticles Comprised of Reduced CNCs Spray Dried at Lower Temperatures (150-70° C.).

Reduced CNCs obtained using the method defined above were spray dried using an inlet temperature of 150° C. and an outlet temperature of 70° C.

Figure 3:
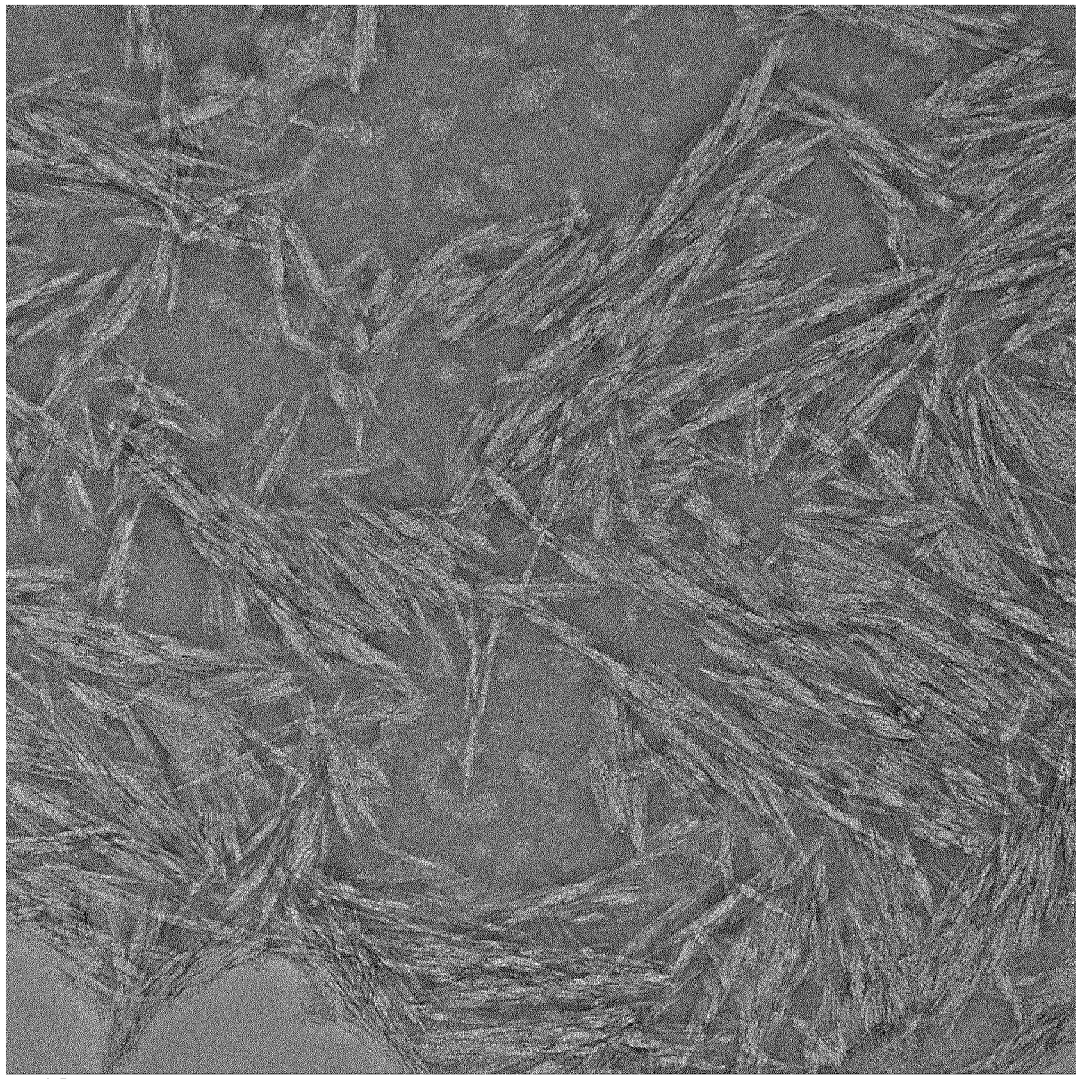
FIG. 3 is a TEM image of cellulose nanocrystals before they have been dried to form microparticles according to embodiment of the present invention.
Figure 4:
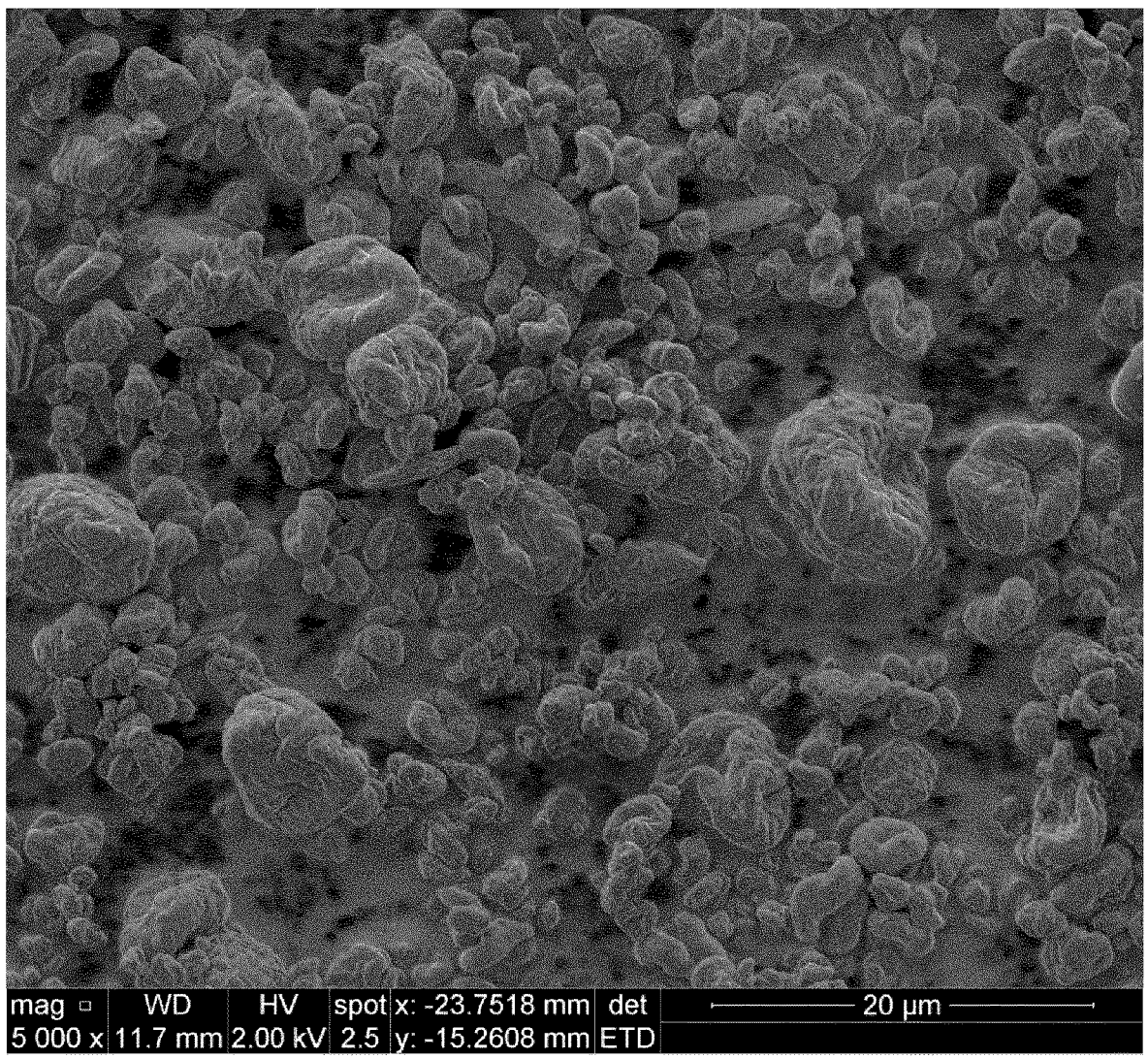
FIG. 4 is an SEM image of microparticles according to an embodiment of the present invention.
Figure 5:
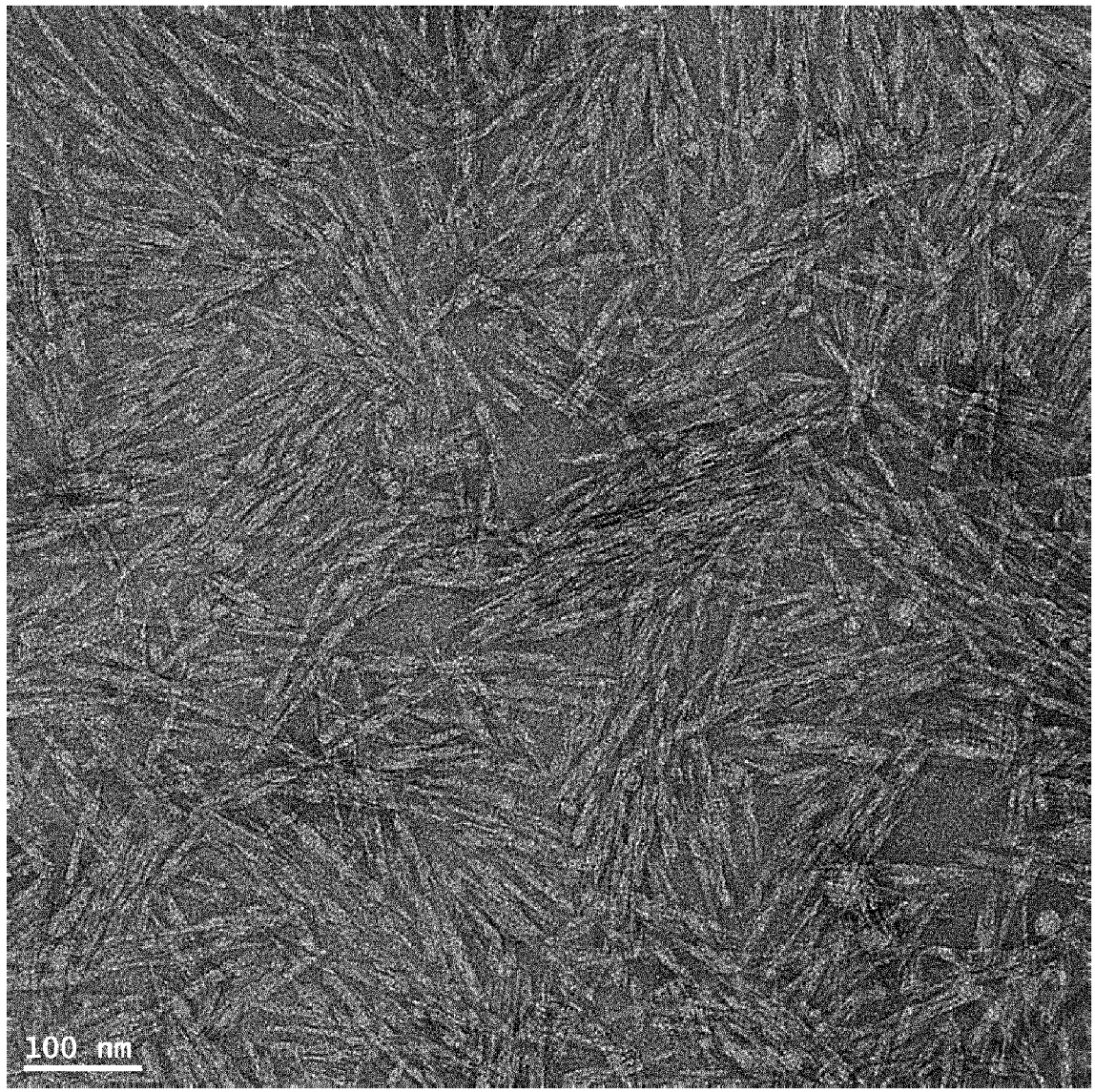
FIG. 5 is a TEM image of cellulose nanocrystals obtained by redispersing microparticles according to an embodiment of the present invention.

FIG. 3 shows the CNCs used as a starting material. FIG. 4 shows the microparticles obtained by spray-drying. FIG. 5 shows the CNCs obtained by redispersing the microparticles in water.

Nanoredispersibility in water: The resulting microparticles comprised of spray-dried CNCs were redispersed in water at 1% w/v; nanoredispersibility was found to be 99.5%.

Nanoredispersibility in ethylene glycol: the nanoredispersion percentage was found to be 60% in ethylene glycol.

Comparative Example 2—Microparticles Comprised of Unreduced CNCs Spray Dried at 185-85° C.

In this sample, a CNC aqueous suspension was prepared according to step 1 of the method described above, and the suspension was spray dried using an inlet temperature of 185° C. and an outlet temperature of 85° C.

Nanoredispersibility in water: The resulting microparticles comprised of spray-dried CNCs were redispersed in water at 1% w/v; nanoredispersibility was found to be 0%.

Nanoredispersibility in ethylene glycol: the nanoredispersion percentage was found to be 24% in ethylene glycol.

Comparative Example 3—Microparticles Comprised of Reduced CNCs Spray Dried at 185-85° C.

In this sample, a reduced CNC aqueous suspension was prepared according the method described above, and the suspension was spray dried using an inlet temperature of 185° C. and an outlet temperature of 85° C.

Nanoredispersibility in water: The resulting microparticles comprised of spray-dried CNCs were redispersed in water at 1.25% w/v; nanoredispersibility was found to be 84.4%.

Nanoredispersibility in ethylene glycol: the nanoredispersion percentage was found to be 40% in ethylene glycol.

Comparative Example 4—Microparticles Comprised of Unreduced CNFs Spray Dried at 185-85° C.

In this sample, a CNF aqueous suspension was prepared according to step 1 of the method described above, and the suspension was spray dried using an inlet temperature of 185° C. and an outlet temperature of 85° C.

Nanoredispersibility in water: The resulting microparticles comprised of spray-dried CNFs were redispersed in water at 0.5% w/v; nanoredispersibility was found to be 16%.

Nanoredispersibility in ethylene glycol: the nanoredispersion percentage was found to be 13% in ethylene glycol.

Comparative Example 5—Microparticles Comprised of Reduced CNFs Spray Dried at 185-85° C.

In this sample, a reduced CNF aqueous suspension was prepared according the method described above, and the suspension was spray dried using an inlet temperature of 185° C. and an outlet temperature of 85° C.

Nanoredispersibility in water: The resulting microparticles comprised of spray-dried CNFs were redispersed in water at 0.5% w/v; nanoredispersibility was found to be 79.7%.

Nanoredispersibility in ethylene glycol: nanoredispersibility in ethylene glycol was calculated using the same method described above. However, the sample was damaged after being washed with ethanol. Regardless, the sample had been dried and weighed after being washed with acetone, and the nanoredispersion percent was found to be 8% using that weight.

It is expected that the nanoredispersion percentage would have been slightly higher after having been washed with ethanol.

Comparative Example 6—Microparticles Comprised of Reduced CNFs Spray Dried at 150-70° C.

Reduced CNFs obtained using the method defined above were spray dried using an inlet temperature of 150° C. and an outlet temperature of 70° C.

Nanoredispersibility water: The resulting microparticles comprised of spray-dried CNFs were redispersed in water at 0.5% w/v; nanoredispersibility was found to be 96.3%.

Nanoredispersibility in ethylene glycol: the nanoredispersion percentage was found to be 5% in ethylene glycol.

Comparative Examples 7 and 8—Microparticles Comprised of Unreduced CNCs and CNFs Spray Dried at 150-70° C.

In these Comparative Examples, two control experiments were performed. Specifically, Comparative Examples 7 and 8 utilized a never-dried non-reduced CNC suspension and a never-dried non-reduced as-received CNF suspension, respectively. Both suspensions were spray dried using an inlet temperature of 150° C. and an outlet temperature of 70° C.

With regard to the carboxylated CNC suspension, the resulting spray-dried CNC powder was redispersed at 1% w/v in water by mixing for around 16 hours at 300 rpm. The size according to DLS was 2804 nm, meaning no signs of nanoredispersion were observed.

With regard to the CNF suspension, the resulting spray-dried CNF powder was redispersed at 0.5% w/v in water by mixing for around 16 hours at 300 rpm. The size according to DLS was 3785 nm, meaning no signs of nanoredispersion were observed.

These Comparative Examples indicate that lowering the spray-drying temperature by itself (without the $NaBH_4$-reduction step) does not lead to nanoredispersibility of either CNCs or CNFs.

Example 9—Omission of Purification Step

In this Example, microparticles comprised of reduced CNCs were produced as described in Example 1, except that the purification step (diafiltration) was omitted. After reducing the never-dried carboxylated CNC suspension, following the same procedure as Example 1 but without the diafiltration, the reduced CNCs were spray-dried immediately using an inlet temperature of 150° C. and an outlet temperature of 70° C. The spray-dried CNCs were nanodispersed at 1% w/v in water by mixing in mild conditions (300 rpm); the nanodispersed CNCs were 230 nm in size (DLS), demonstrating good nanoredispersibility.

This Example indicates that the purification step is optional to achieve good CNC nanodispersion. Accordingly, CNC nanodispersion can be achieved without purification of the CNC aqueous suspension.

TABLE 1

Redispersion in Water

| Example/ Comp. Example | Type of cellulose (CNC/ CNF) | Reduced (y/n) | Spray drying temperature (inlet-outlet ° C.) | Concentration at redispersion (%) | Concentration for centrifugation (%) | Size in redispersion after mixing, Z (nm) | Size in supernatant, Z (nm) | Redispersion percent (%) |
|---|---|---|---|---|---|---|---|---|
| Example 1 | CNC | Yes | 150-70 | 1 | 1 | 234 | 224 | 99.5 |
| Comp. Example 2 | CNC | No | 185-85 | 1 | 1 | > 2 microns | 1400 | 0 |
| Comp. Example 3 | CNC | Yes | 185-85 | 1.25 | 1.25 | 285 | 288 | 84.4 |
| Comp. Example 4 | CNF | No | 185-85 | 0.5 | 0.1 | 5100 | 740 | 16 |
| Comp. Example 5 | CNF | Yes | 185-85 | 0.5 | 0.1 | 395 | 236 | 79.7 |
| Comp. Example 6 | CNF | Yes | 150-70 | 0.5 | 0.1 | 355 | 272 | 95.3 |
| Comp. Example 7 | CNC | No | 150-70 | 1 | NA | 2804 | NA | NA |
| Comp. Example 8 | CNF | No | 150-70 | 0.5 | NA | 3785 | NA | NA |
| Example 9 | CNC | Yes | 150-70 | 1 | NA | 230 | NA | NA |

NA = not measured

TABLE 2

Redispersion in Ethylene Glycol

| Example/ Comp. Example | Type of cellulose (CNC/ CNF) | Reduced (y/n) | Spray drying temperature (inlet-outlet ° C.) | Concentration at redispersion (%) | Concentration for centrifugation (%) | Size in redispersion after mixing, Z (nm) | Size in redispersion after 5 min sonication (nm) | Size in redispersion 15 min after sonication (nm) |
|---|---|---|---|---|---|---|---|---|
| Example 1 | CNC | Yes | 150-70 | 0.1 | 0.1 | 1368 | 745 | 411 |
| Comp. Example 2 | CNC | No | 185-85 | 0.1 | 0.1 | 831 | 806 | 690 |
| Comp. Example 3 | CNC | Yes | 185-85 | 0.1 | 0.1 | 1524 | 812 | 611 |
| Comp. Example 4 | CNF | No | 185-85 | 0.1 | 0.1 | 1662 | 1311 | 1158 |

TABLE 2-continued

Redispersion in Ethylene Glycol

| Example/ Comp. Example | Type of cellulose (CNC/ CNF) | Reduced (y/n) | Spray drying temperature (inlet-outlet ° C.) | Concentration at redispersion (%) | Concentration for centrifugation (%) | Size in redispersion after mixing, Z (nm) | Size in redispersion after 5 min sonication (nm) | Size in redispersion 15 min after sonication (nm) |
|---|---|---|---|---|---|---|---|---|
| Comp. Example 5 | CNF | Yes | 185-85 | 0.1 | 0.1 | 1105 | 1304 | 792 |
| Comp. Example 6 | CNF | Yes | 150-70 | 0.1 | 0.1 | 2111 | 1142 | 1318 |

Example 10—Effect of Aging on the Viscosity of Nanoredispersed CNC Suspension Combined with Styrene-Acrylic Latex Emulsion An anionically stabilized styrene acrylic resin (Encor®123 from Arkema) was used. The latex consisted of an aqueous dispersion of 60% solids adjusted to a pH of 8.9. The mean particle size was 0.5 μm and the suspension had a viscosity of 150 cP. A cCNC powder, as produced in Example 1, was dispersed in water at a concentration of 5 wt % at a speed of 20,000 rpm for a total of 15 minutes with an IKA T25 high-shear disperser equipped with an S25N-18G dispersing element. cCNC particle size was particle size was 204 nm by analysis with a Nanotrac particle sizer.

Accordingly, styrene acrylic resin was mixed with cCNC to a loading of approximately 1 wt % CNC, by combining 32 mL of resin with 8 mL of a 5 wt % aqueous cCNC dispersion, and mixing these thoroughly in the water host medium.

Shear viscosity was measured at room temperature immediately after sample preparation and then after aging the sample for one month at 50° C. A Brookfield viscometer/rheometer was used to acquire the data (spindle #4, 60 rpm at 25° C.). The terms LTH and HTL mean that the shear thinning was measured in the Low-to-high (diamonds) and high-to-low (squares) directions.

Figure 6:
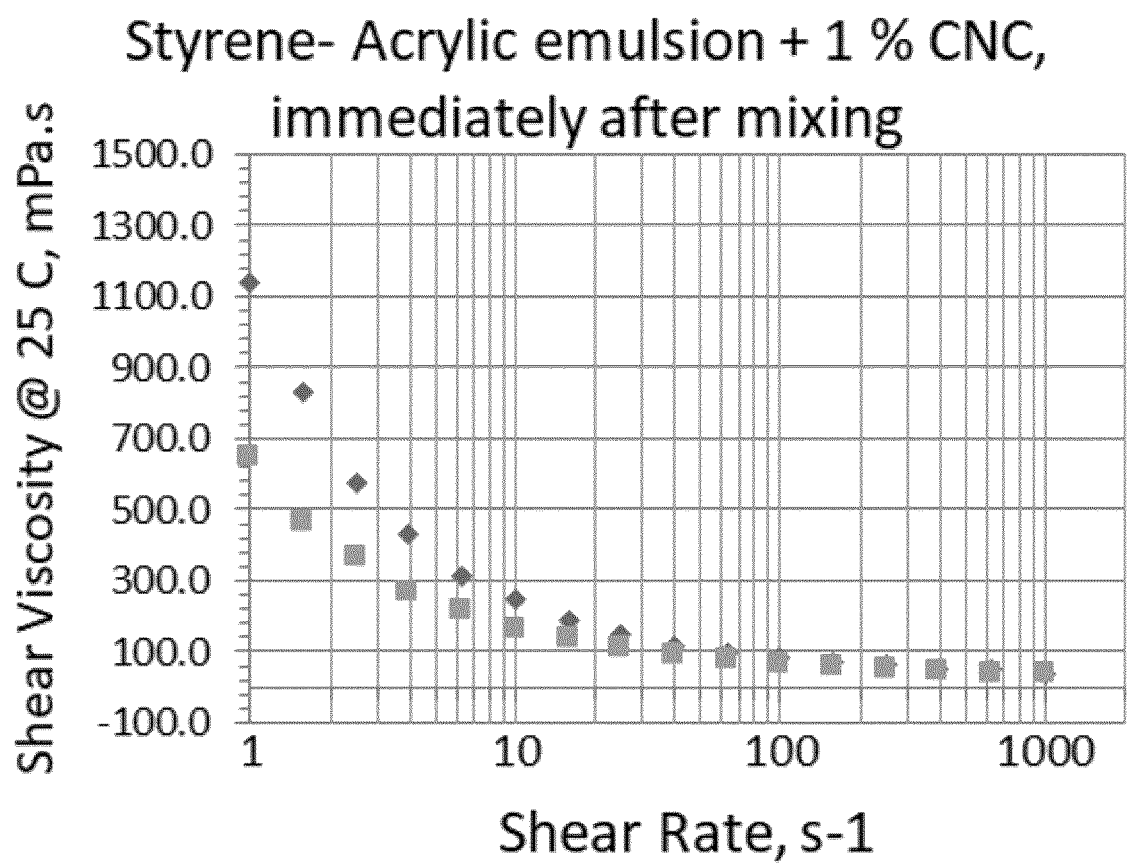
FIG. 6 shows the viscosity of a nanoredispersed CNC suspension combined with a styrene-acrylic latex emulsion immediately after sample preparation and then after aging the sample for one month at 50° C.
Figure 7:
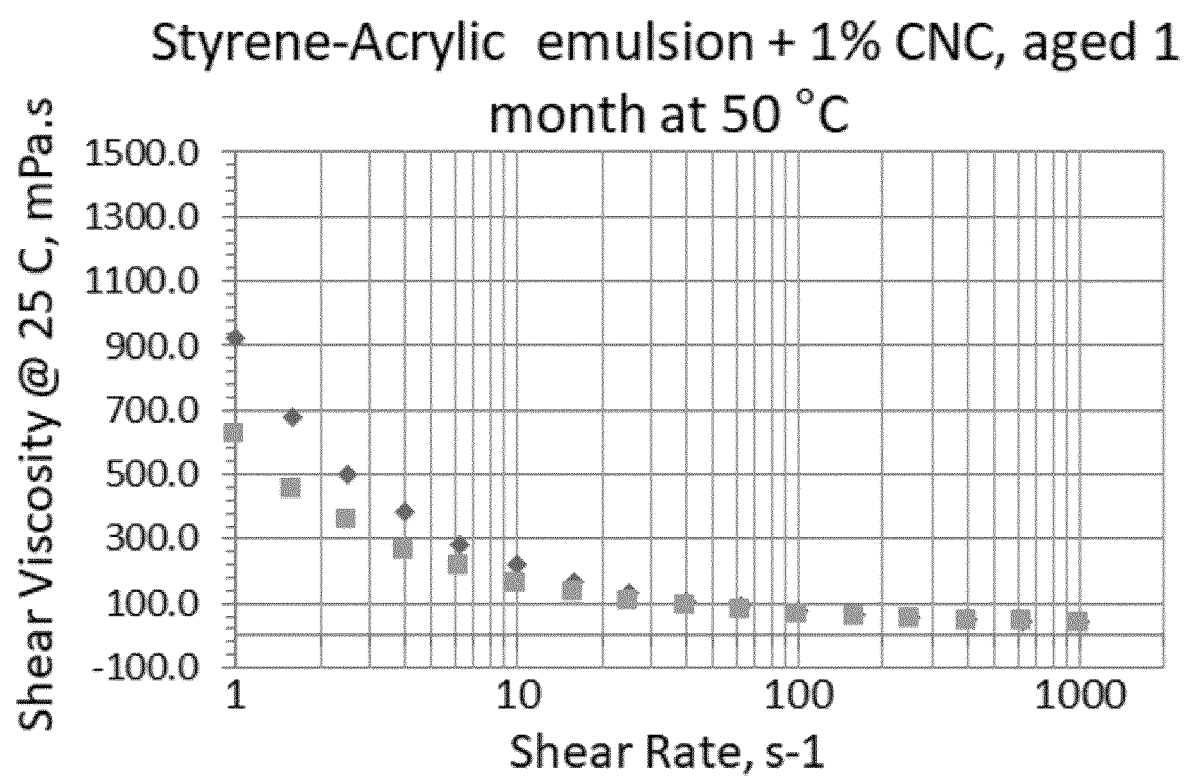
FIG. 7 shows the viscosity of a nanoredispersed CNC suspension combined with a styrene-acrylic latex emulsion after aging for one month at 50° C.

The results are shown in FIGS. 6 and 7, respectively. The curves show that the viscosity is stable over more than 1 month at 50° C.

Example 11—Abrasion Resistance and Adhesion of Polymer Coatings Enhanced by Incorporation of Nanodispersed CNC Acrylic resin (Encor® 626 from Arkema) and vinyl acrylic resin (Encor® 379G from Arkema) were separately combined with CNC nanodispersed in water. cCNC was dispersed using the same method as Example 10.

Two formulations were prepared:
Formulation (1) 60 ml of Encor 626 resin was mixed with 12.4 ml of 5 wt % aqueous suspension of nanodispersed CNC, 15 ml of 2% hydroxyethyl acetate (HEC) solution, and 2.75 ml of Texanol (a coalescing aid). The viscosity of the mixture was 850 cP. The content of CNC in the final dry film was 2%.
Formulation (2) 60 ml of Encor 379G resin was mixed with 14.2 ml of 5 wt % aqueous suspension of CNC, 15 ml of 2% HEC solution, and 3 ml of Texanol (coalescing aid). The viscosity of the mixture was 890 cP. The content of CNC in the final dry film was 2%.
Comparative formulations without CNC were also prepared.

Abrasion Resistance

Chromated aluminum plates with dimensions 4"×6" were coated with prepared formulation (A) or (B) using a drawdown rod of wire size 40. This drawdown rod yielded a film thickness of approximately 25 μm determined with an Elcometer gauge. The drawdown coatings were applied a total of 4 times so that the final thickness was approximately 100 μm. Films were allowed to cure in an oven for 24 hours at 60° C. between coatings before being subjected to a Taber® rotary platform abrasion test (Taber model 5130 abraser). These Taber measurements were performed according to ASTM D4060. The wear index (I) for abrasion was calculated from the formula, $I=[(A-B) * 1000]/C$. Variable A is the weight of the specimen before abrasion and B is the weight after abrasion. C is the number of test cycles.

Table 3 shows that addition of 2 wt % nanoredispersible CNC confers a 10-14% increase in abrasion resistance in TABER® tests compared to latex film coatings prepared without CNC.

TABLE 3

Abrasion test results for CNC/latex coatings

| Sample | Wear Index, I | % Difference |
|---|---|---|
| Formulation 1 - Acrylic, 0% CNC | 56 | |
| Formulation 1 - Acrylic, 2% CNC | 48.2 | +13.9 |
| Formulation 2 - Vinyl-acrylic, 0% CNC | 49.8 | |
| Formulation 2 - Vinyl-acrylic, 2% CNC | 45.2 | +9.2 |

Adhesion

Films of two Encor 626 formulations (0% CNC and 2% CNC), prepared as described above for the abrasion test, were subjected to adhesion tests using the tape test method (ASTM D3359). Samples were cured by storing in an oven at 60° C. for 24 hours before conducting the adhesion test. All tests were conclusive for excellent adhesion to the substrate, with no peeling away of any portion of the film.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

Satoshi Takaichi, Tsuguyuki Saito, Reina Tanaka, Akira lsogai, "*Improvement of nanodispersibility of oven-dried TEMPO-oxidized celluloses in water*", Cellulose, 2014, 21:4093—4103
US 4,481,076
WO2016015148A1
WO2014/183082A1

The invention claimed is:
1. A cellulose microparticle comprising dried cellulose nanocrystals (CNCs) agglomerated together and forming said microparticle, wherein the CNCs are surfaced-reduced carboxylated CNCs, and wherein the microparticle is nanoredispersible into its constituting cellulose nanocrystals in both at least one aqueous solvent and at least one non-aqueous solvent, wherein the nanoredispersibility of the microparticle is at least 45 wt % in each of the at least one aqueous solvent and the at least one non-aqueous solvent, and wherein the microparticle is produced by a method comprising the steps of:
  a. reducing carboxylated cellulose nanocrystals (CNCs) using a reducing agent to produce the surface-reduced carboxylated CNCs;
  b. producing an aqueous suspension of the surface-reduced carboxylated CNCs; and
  c. spray-drying the aqueous suspension of the surface-reduced carboxylated CNCs, thereby producing the microparticles,
wherein the spray-drying is performed using a spray-dryer operating with an inlet temperature of about 140° C. to about 160° C. and an outlet temperature of about 65° C. to about 75° C.

2. The microparticle of claim 1, wherein the microparticle is nanoredispersible in water, ethylene glycol, and mixtures thereof.

3. The microparticle of claim 1, wherein the nanoredispersibility of the microparticle in the at least one aqueous solvent is at least about 90 wt %.

4. The microparticle of claim 1, wherein the nanoredispersibility of the microparticle in the at least one non-aqueous solvent is at least about 55 wt %.

5. The microparticle of claim 1, wherein the microparticle comprises one or more additives.

6. The microparticle of claim 5, wherein the one or more additives is:
  an organic acid;
  an acrylate polymer;
  a water soluble polymer; or
  a combination thereof.

7. A method for producing microparticles as defined in claim 1, comprising the steps of:
  a. reducing carboxylated cellulose nanocrystals (CNCs) using a reducing agent to produce surface-reduced carboxylated CNCs;
  b. producing an aqueous suspension of the surface-reduced carboxylated CNCs; and
  c. spray-drying the aqueous suspension of the surface-reduced carboxylated CNCs, thereby producing the microparticles,
wherein the spray-drying is performed using a spray-dryer operating with an inlet temperature of about 140° C. to about 160° C. and an outlet temperature of about 65° C. to about 75° C.

8. The method according to claim 7, wherein the method further comprises the step of, before the reduction step a), providing an aqueous suspension of carboxylated CNCs that have not been allowed to dry after their production.

9. The method according to claim 7, wherein carboxylated CNCs that have been dried after their production are redispersed as a suspension before the reduction step a).

10. The method according to claim 7, wherein the method further comprises, before reducing step a), the step of providing an aqueous suspension of the carboxylated CNCs.

11. The method according to claim 7, wherein the carboxylated CNCs are reduced using a $NaBH_4$ solution or a $NaBH_4$ powder.

12. The method according to claim 10, wherein the method further comprises the step of adjusting the pH of the aqueous suspension of carboxylated CNCs to at least about 9 before the reduction step a).

13. The method according to claim 10, wherein, after the reducing agent is added, the aqueous suspension of carboxylated CNCs is stirred for at least about 1 hour.

14. The method according to claim 7, wherein, during step b), the reaction mixture produced during step a) is purified.

15. The method according to claim 7, wherein the surface-reduced carboxylated CNCs are spray-dried in step c) using an inlet temperature of at least about 145° C.

16. The method according to claim 7, wherein the aqueous suspension is spray-dried in step c) using an outlet temperature of at least about 70° C.

17. The method according to claim 7, wherein the aqueous suspension is spray-dried in step c) using an inlet temperature of about 150° C. and an outlet temperature of about 70° C.

18. The microparticle of claim 1, wherein the nanoredispersibility of the microparticle in the at least one aqueous solvent is at least about 95 wt %.

19. The method according to claim 7, wherein the surface-reduced carboxylated CNCs are spray-dried in step c) using an inlet temperature of at most about 155° C.

20. The method according to claim 7, wherein the aqueous suspension is spray-dried in step c) using an outlet temperature of at most about 70° C.

* * * * *